(12) United States Patent
Ailey

(10) Patent No.: US 8,298,343 B2
(45) Date of Patent: Oct. 30, 2012

(54) METHOD AND APPARATUS FOR REMOVING ICE ACCUMULATIONS ON POWER LINES

(76) Inventor: Timothy D. Ailey, Woodland, IL (US)

( * ) Notice: Subject to any disclaimer, the term of this patent is extended or adjusted under 35 U.S.C. 154(b) by 0 days.

(21) Appl. No.: 13/109,701

(22) Filed: May 17, 2011

(65) Prior Publication Data

US 2011/0283473 A1    Nov. 24, 2011

Related U.S. Application Data

(60) Provisional application No. 61/347,196, filed on May 21, 2010.

(51) Int. Cl.
*B08B 7/04* (2006.01)

(52) U.S. Cl. ............ 134/6; 134/7; 134/42; 15/256.5; 15/256.51; 15/256.52; 15/256.53

(58) Field of Classification Search ............ 134/6, 7, 134/42; 15/256.5, 256.51, 256.52, 256.53
See application file for complete search history.

(56) References Cited

U.S. PATENT DOCUMENTS

| 3,835,269 | A | * | 9/1974 | Levin et al. ............ 191/62 |
| 4,212,378 | A | * | 7/1980 | Hrovat ............ 191/62 |
| 2007/0278349 | A1 | * | 12/2007 | Bembridge et al. ...... 244/134 R |
| 2010/0243633 | A1 | * | 9/2010 | Huynh et al. ............ 219/209 |
| 2011/0283473 | A1 | * | 11/2011 | Ailey ............ 15/143.1 |

FOREIGN PATENT DOCUMENTS

SU    1372442 A  *  2/1988

* cited by examiner

*Primary Examiner* — Bibi Carrillo
(74) *Attorney, Agent, or Firm* — Leydig, Voit & Mayer, Ltd.

(57) ABSTRACT

A method and apparatus for removing ice from overhead utility power lines which includes a tool having an extendable pole with an ice removing roller having an annular outer channel rotatably supported on the pole. The pole is extendable for enabling a user to place the roller over an ice-laden utility power line while standing on the ground, and then is movable along the power line by the workmen while standing on the ground or walking along a line parallel to the power line for removing ice from the line.

1 Claim, 9 Drawing Sheets

METHOD AND APPARATUS FOR REMOVING ICE ACCUMULATIONS ON POWER LINES

CROSS-REFERENCE TO RELATED APPLICATIONS

This patent application claims the benefit of U.S. Provisional Patent Application No. 61/347,196, filed May 21, 2010, which is incorporated by reference.

FIELD OF THE INVENTION

The present invention relates generally to electric utility power lines, and more particularly, to a method and apparatus for removing ice accumulations on such utility power lines.

BACKGROUND OF THE INVENTION

In the electric utility industry, ice accumulation on overhead utility power lines is an ongoing seasonal battle. Even light accumulations of ice on the lines can be enough to cause major interruptions to a utility's power distribution system.

Utility lines typically comprise poles set into the ground with crossarms and other attachment points bolted to the poles to support the line or the wire. The poles commonly are made primarily of wood, as well as fiberglass, steel, concrete or a composite material. After the poles are set in the ground, the wire is pulled from pole to pole and securely fastened to the attachment points. The length of wire that runs from one pole to the next pole is called a span. The wire is pulled in and brought to a pre-calculated tension and a predetermined sag. The sag is the amount of slack in the wire across the span which is most visible at the center point of the span. This slack or sag in the wire can vary from several inches to two feet or more at the center of the span depending on the length of the span and the size of the wire used. As freezing rain causes ice to accumulate on the wire, the added weight pulls the wire down further, and can often cause the wire or the poles and crossarms to break.

Wind driven freezing rain causes the formation of ice on the wire to take an irregular shape, similar to the shape of the wing on an airplane. Due to the aerodynamic nature of this formation, the wind creates lift in the wire. As this form of perpetual motion intensifies, the slack in the wire rises and falls in a very powerful and often violent manner referred to as galloping, which can continue well after the wind has stopped blowing.

When the ice laden line gallops, the slack in the line can rise to a height that is equal to or sometimes greater than the desired sag or lowest center point. Tremendous energy is produced by this condition and can cause severe damage to the section of line, again resulting in broken poles, crossarms, insulators and wire.

A simple distribution single phase line construction consists of two wires. Depending upon the type of construction, one wire at the top of the pole is energized from 2,400 to 7,200 volts or more. The other wire is grounded to earth and called neutral. The neutral can be on a crossarm with the energized phase or lower on the pole. During fair conditions, these two wires form a uniform sag with one another at the center of the span. When ice laden galloping of the lines occurs, however, the slack in both wires is caused to raise and fall at different intervals throughout the span. Depending on where the galloping of each wire occurs, there are times when the two wires make contact with one another, creating a fault that can blow a line disconnect fuse or cause a breaker to open resulting in interruption of service.

At times the two wires do not make contact long enough to interrupt service, but will cause a blinking or flickering of lights. This condition may result in damage to household appliances due to voltage fluctuation, often referred to as a power surge. There are other situations where the galloping wires make contact and burn one or both wires in two. The burned wires then fall to the ground resulting in an interruption of service and pose a threat to public safety.

A three phase distribution line construction consists of three energized phases on a crossarm with the neutral located at a lower point on the pole. In some cases the neutral is located on the crossarm with all three phases. Ice laden galloping wire in three phase systems can be more of a problem than that of single phase. The three energized phases cannot make contact with one another, as well as the neutral.

Three phase voltage is measured in two ways. Phase to phase voltage and phase to ground. A 7,200 volt distribution system would measure 7,200 volts to ground or the neutral and 12,470 volts phase to phase. Therefore, phase to phase contact causes a larger fire and often results in the wire burning to the ground causing costly interruptions of service. Phase to phase contact due to galloping can also cause flickering or blinking lights which can lead to customer appliance damage.

Galloping three phase systems, furthermore, can cause a higher level of damage since there are four wires involved. When the three energized phases and the system neutral gallop at the same time, stresses can exceed the stress rating of the components of the system causing major damage and system failure. These types of damage often cover a large service area affecting many customers, and repair or rebuilding of the overhead electrical system, requires many workers and can take an extended amount of time.

The removal of ice from an entire overhead electric system has been impossible. When the wire breaks or burns down, the ice must be removed from the broken wire or wires. The ice must also be removed from any wires in that span which remain intact. This ice removal is necessary so the repaired wire can be brought back to the original sag as close as possible. Many times the ice needs to be removed in the span or spans on either side of the damaged span because the broken wire slid through the ties at the attachment points on the poles and is hanging much lower than the rest of the wire that remained intact. The ice must be removed from the wire to eliminate the extra weight involved so the two broken ends can be pulled together and repairs made. Ice also must be removed from all wires in the area of the repair made so the sag of the group will match one another as close as possible. This will allow all the wires in the given span to sway with the wind in a more uniform manner thus eliminating the chance for them to contact one another.

If the ice is not removed in these situations, then the repaired wire will end up much higher than the other ice laden wires. In most cases, when the wire broke and fell to the ground much of the ice fell off the two broken tails, thus making them lighter than the remaining ice covered wires. If the wind would create a galloping situation, the higher repaired wire having less ice accumulation would be an easy target for contact from another wire due to the violent galloping action of the ice covered wires and would result in an interruption of service or just burn back down. These repairs are labor intensive and time consuming. It is of utmost importance the repair work is performed correctly the first time.

When temperatures rise above freezing, the ice begins to fall from the wire, which can create further problems. If the temperature should rise above freezing at a quick rate, large lengths of ice fall. When these large lengths of ice fall, the wire sheds large amounts of weight caused by the ice, allowing the wire to slingshot in an upward motion. When this condition exists, the speed of the rising wire and free floating action can lead to contact with another wire or wires resulting in previously stated voltage issues and or system failure. This once again leads to costly and labor intensive repairs and jeopardizes continuity of service to a utility's customer network. The thawing related system interruptions are extremely difficult to control or avoid. Utility workers can only hope the ice layer will thaw and fall at a gradual rate so this condition can be avoided. If downed and broken wire is repaired and the removal of ice on the remaining intact wires are left untouched, the span or spans of wire involved in the repair process are at great risk of thawing related system failures. As previously stated, if one wire was repaired and had ice removed, it would ride at a higher level in the span. Again, the wire would be an easy target to be contacted by a flying wire that had just shed its heavy ice load, leading to system interruption. If the removal of the ice is not performed during the repair process, this leaves the span or spans affected open for failure when thawing occurs. The same work crew can then be required to make repairs in the same span or spans more than just one time.

The removal of ice accumulation from overhead utility power lines for preventing or reducing the foregoing problems can be a very labor intensive process. Utilities are not able to build their lines right along a city street or country road due to right of way issues or extreme added expense to shift construction of a line to a roadway. Therefore, numerous miles of line are built in private right of ways such as unpaved alleys, backyards, farm fields, forests, mountainous terrain, and railroad property. Most of these areas are not accessible to the typical bucket repair truck. Soft soil conditions, extreme mud, building placement on a given property, deep snow or extreme terrain often do not allow access by truck. Owners of these private right of ways also do not want their property severely damaged by heavy utility trucks. There are situations where extreme safety concerns exist and it is necessary to find a way to drive a truck into these areas. The damage to private property in that case cannot be avoided and most utilities will pay for restoration of the damage. When a pole cannot be accessed by a truck, the utility workers are required to physically climb the pole or poles. Climbing a pole is accomplished by using a pair of specially manufactured pole climbers strapped to the worker's boots and a body positioning belt strapped around the waist. The body belt has a long safety strap that is placed around the pole and enables the worker to maintain position on the pole and maneuver as necessary. Climbing a pole requires a great amount of training, practice, skill, and intensive physical exertion. If a crew responds to a downed or broken wire in private right of way that is not accessible by truck, someone has to climb the pole or poles to make repairs.

Wires that remained intact, as indicated above, also require the ice to be removed from them. This is accomplished by either extending fiberglass rods to reach the wire, knocking the ice off the wire, or by using a large cumbersome device called a stringing dolly. A stringing dolly consists of a large roller attached inside an aluminum framework with a trap door that can be opened for the placement of wire inside the frame to ride on the roller. This trap door can be locked in the closed position to avoid having the wire fall out of the roller. The line must be de-energized in order to remove the ice with the stringing dolly, which puts customers who still had service out of service until repairs are made.

A worker atop the pole places the dolly on the ice laden wire and then ties a long rope to the dolly. Another worker on the ground then takes the rope and pulls down with force. While pulling down on the rope and dolly, the worker then walks to the next pole. Pulling down with force and dragging the dolly at the same time, peels the ice accumulation from the wire. When the worker on the ground arrives at the next pole in the line, a return trip is required back to the pole of origin. Upon arrival at the pole of origin, the worker atop the pole removes the dolly and places it on another wire if needed. This removal process is performed on all the wires in the affected span or spans. This process requires a great amount of physical energy and stamina in both climbing the poles and downward pulling of the dolly. In addition, to effect removal of the ice, it is necessary for the worker to walk nearly directly under the dolly to keep enough downward pulling force on the rope to peel off the ice. At times, large lengths of ice can fall during this process and pose a safety hazard to the worker below. The process requires a number of workers, and two or three crew members on the ground often trade off to avoid exhaustion. Due to the intense labor involved, this process is commonly referred to as "running the heater". A worker will expel enough energy to raise body temperature and produce large amounts of sweat creating issues of staying warm in the cold conditions after the worker has rested and cooled off.

Although ice storms are perennial problems in the maintenance of utility lines, the physical task of removing ice from utility power lines has remained unchanged for many years, notwithstanding the difficulty, worker fatigue, damage to surrounding areas, and safety concerns. Hence, a great need has existed for an improved system for removing ice from utility power lines.

OBJECTS AND SUMMARY OF THE INVENTION

It is an object of the present invention to provide a method and apparatus for more efficiently, effectively, and safely removing ice from utility power lines.

Another object is to provide a method and apparatus as characterized above which eliminates the necessity for workmen to climb utility power line poles or to captively secure an ice removal device about the utility power line.

A further object is to provide a utility power line ice removal method and apparatus which can be carried out and used without the necessity for de-energizing the utility power line or disrupting customer power service.

Still another object is to provide a method and apparatus of the foregoing type which can be carried out and used by a single workman while working at ground level.

Yet another object is to provide a method and apparatus of the foregoing type which requires less physical exertion than prior ice removal methods. A related object is to provide such a method and apparatus in which the weight of the apparatus itself assists in applying a force for dislodging ice from the line.

A further object is to provide a method and apparatus of the foregoing type which enable the workmen to walk along a path away from the plane of the utility power line being cleaned of ice so as to avoid being showered or potentially injured by the falling ice.

Another object is to provide a utility power line ice removal method and apparatus that can be used without the necessity for deadheading back along a distance between poles after clearing the ice from a span of the utility power line.

Another object is to provide such an easy to use method and apparatus that workmen can routinely remove ice from utility power lines prior to ice buildup that can cause excessive wire galloping or damage to the utility power lines or support poles.

A further object is to provide an apparatus of the foregoing type that is relatively simple and economical in construction and use.

Other objects and advantages of the invention will become apparent upon reading the following detailed description and upon reference to the drawings, in which:

Figure 1:
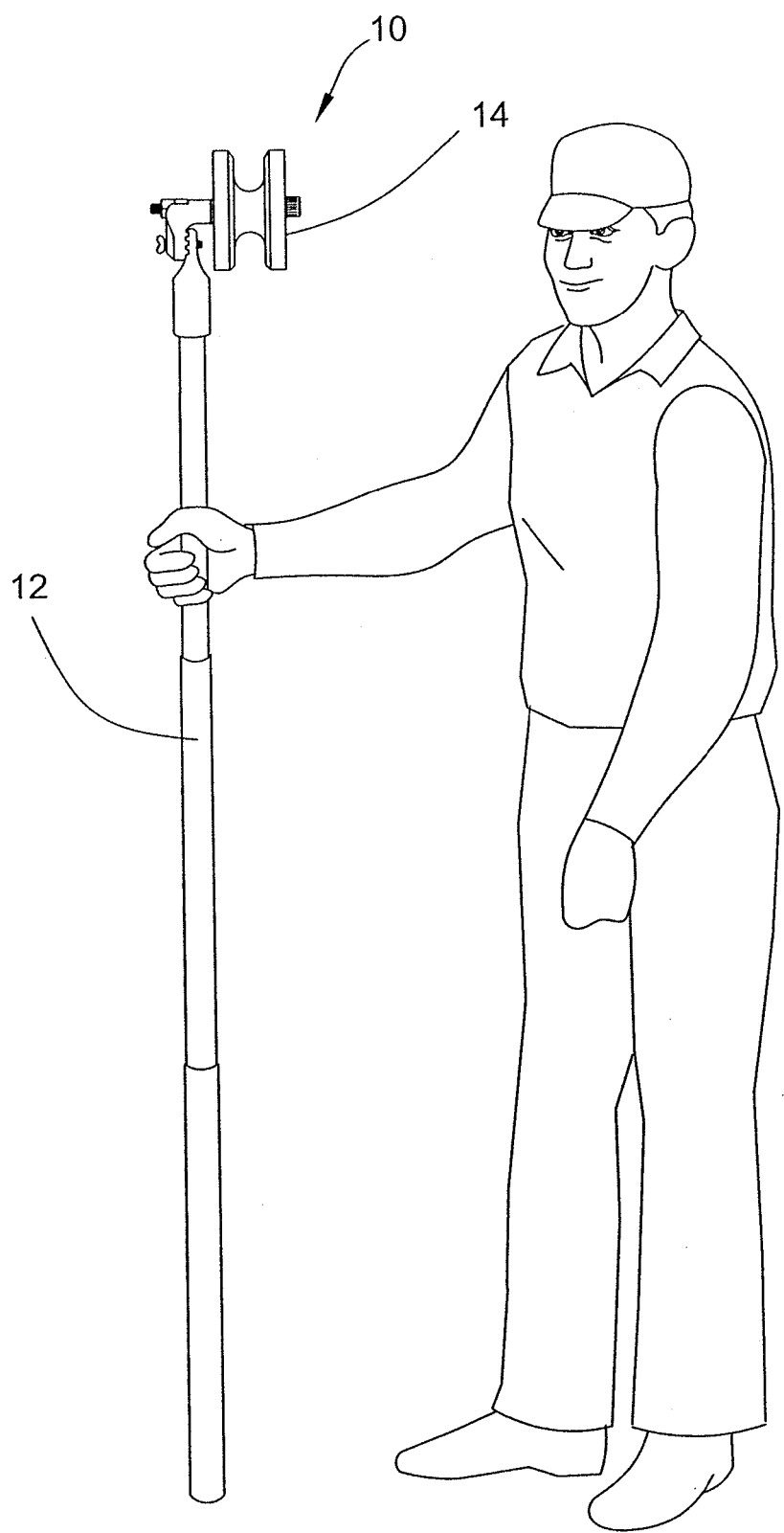
FIG. 1 is a depiction of a workman holding an ice removal apparatus in accordance with the invention, with a support rod of the apparatus in a retracted condition.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring now more particularly to the drawings, there is shown an illustrative hand holdable and usable ice removal device 10 in accordance with the invention for removing ice from overhead power distribution lines 11. The ice removal device 10 includes an extendible support pole 12 having an ice removal roller assembly 14 mounted at an upper end thereof which is positionable over a utility power line 11 by a workman holding the pole 12 while standing on the ground below the utility power line 11 and which is movable along the utility power line 11 for removing ice while the workman walks on the ground along the utility power line. The support pole 12 may be of a conventional extendable type used by utility power line workmen, comprising a plurality of pole sections 12a can be selectively extended from a retracted state and self locked together up to heights of 45 feet. The pole 12 may be made of a fiber glass or other non-conductive material capable of withstanding voltages up to 100,000 volts per foot.

In keeping with the invention, the ice removing roller assembly 14 includes a roller 15 formed with an outwardly opening annular channel 16 that is positionable over a utility power line 11 and is effective for removing ice from the utility power line without the necessity for captive retention about the line. The illustrated channel 16 has a circular bottom 16a that conforms to the cylindrical cross section of the utility power line 11 and outwardly extending flange sides 16b that maintain the roller 15 on the line 11 during usage.

The roller 15, which preferably is made of aluminum, in this case is supported on a roller support adapter 20 by a support rod or axle 21 in the form of a bolt that extends through the roller 15 and adapter 20 and is secured in assembled relation by a retention nut 22. A bushing or suitable bearing 24, interposed between the roller 15 and axle 21 support the roller 15 for relative rotational movement on the axle 21. The roller support adapter 20 in this case has a right angle configuration effective for supporting the roller 15 for rotation about an axis perpendicular to the rod 12.

For mounting the roller support adapter 20 on the support pole 12, the upper most pole section 12a has a pole adapter 30 mounted thereon that is connectable with the roller support adapter 20. The pole adapter 30 in this case has a cylindrical base 31 fixed to the end of the upper most pole section 12a and an upstanding mounting flange 32 having a vertical mating face 33 formed with transverse lugs or projections 34 matable with a complementary mating face 35 of a depending flange 36 of the roller support adapter 20 formed with transversely projecting lugs or projections 38 for interlocking engagement with the mating face 32 of the pole adapter 30. For releasably securing the mating faces 32,36 together in interlocking relation to each other, a wing head bolt 40 extends through the roller support adapter flange 36 into threaded engagement with the pole adapter flange 32.

Figure 2:
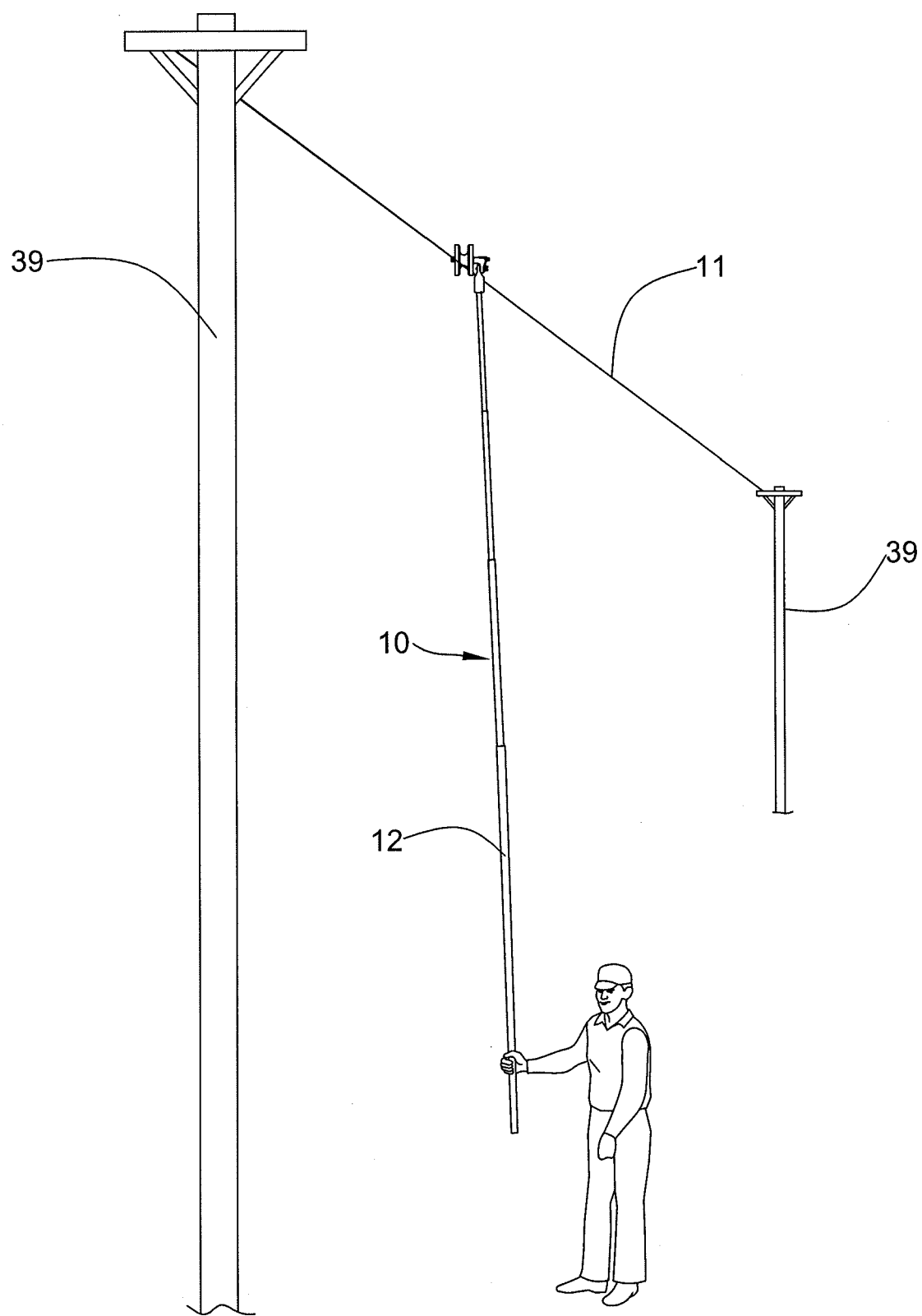
FIG. 2 is a perspective of a workman holding the ice support pole of the illustrated apparatus in an extended position with an ice removal roller assembly in operative position over a utility power line.
Figure 3:
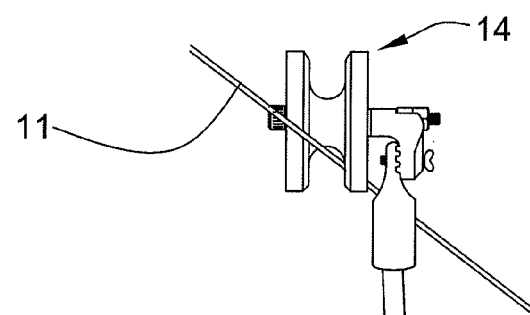
FIG. 3 is an enlarged perspective of the ice removing roller assembly of the illustrated apparatus in operative position on the utility power line.
Figure 3:
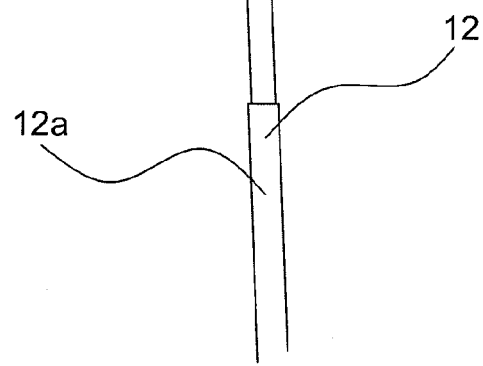
Figure 4:
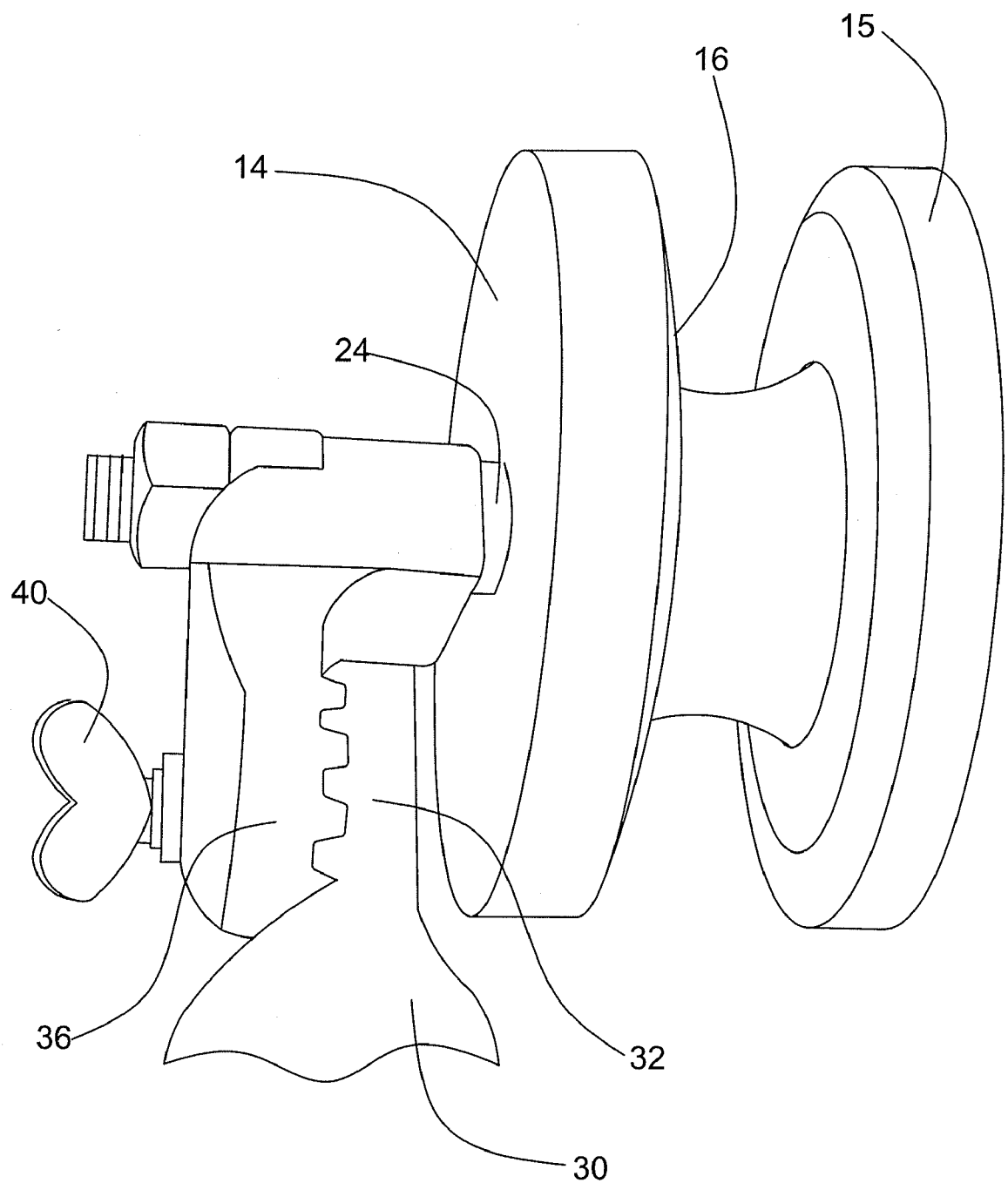
FIG. 4 is an enlarged perspective of the ice removal roller assembly of the illustrated apparatus.
Figure 5:
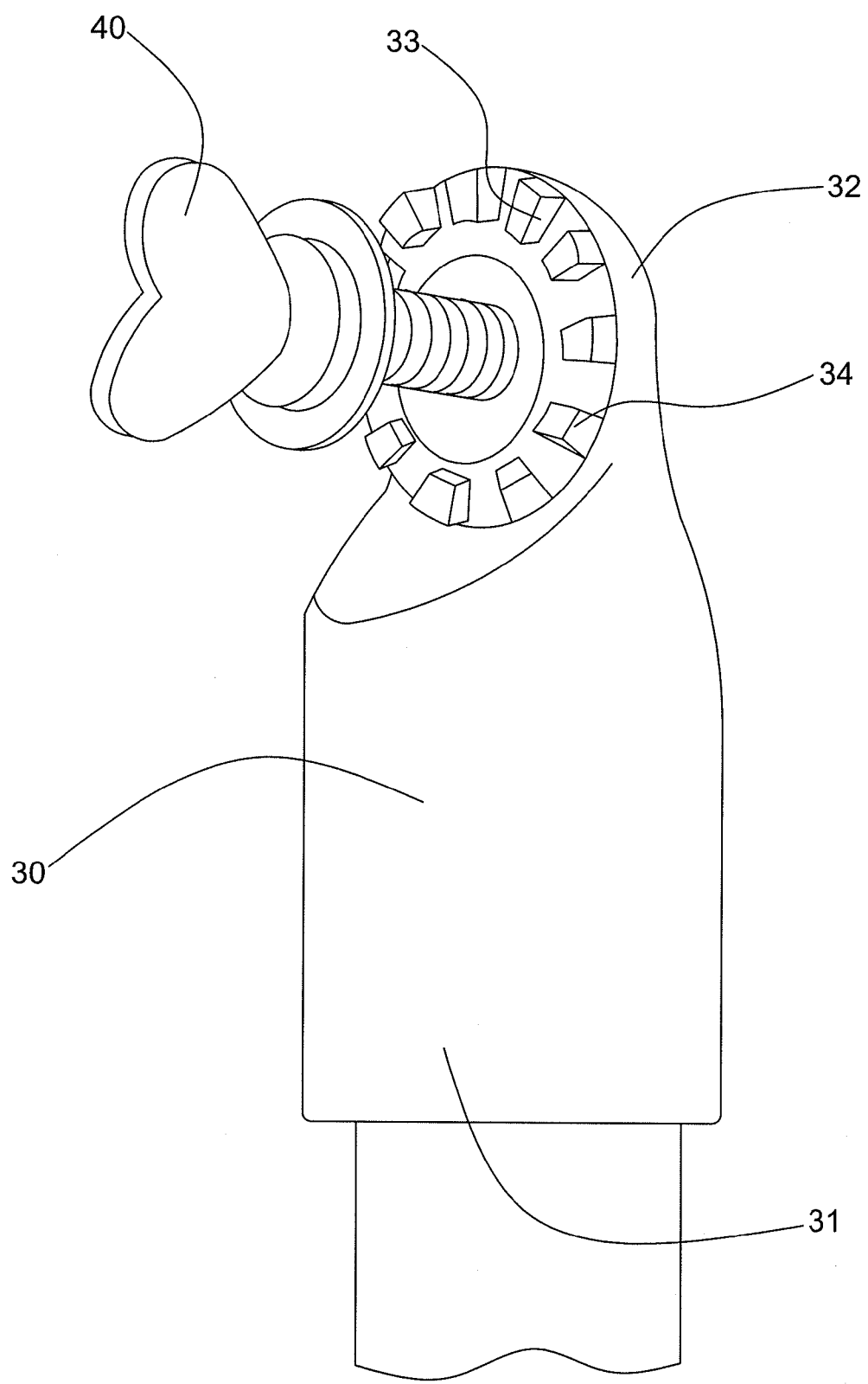
FIG. 5 is a perspective of the roller support with the roller assembly removed.
Figure 6:
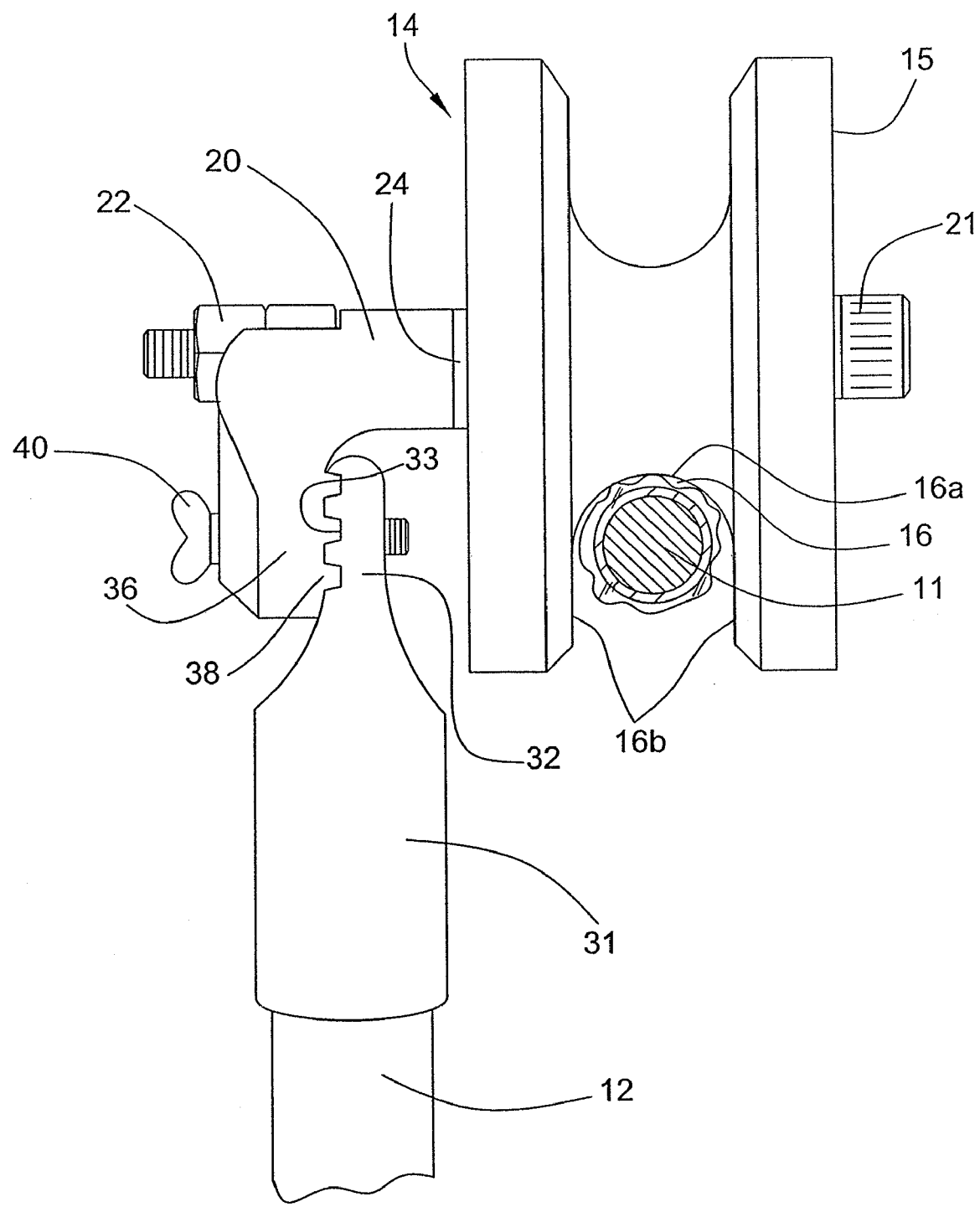
FIG. 6 is a side elevational view of the roller support assembly of the illustrated apparatus and its mounting on the upper end of the support pole.
Figure 8:
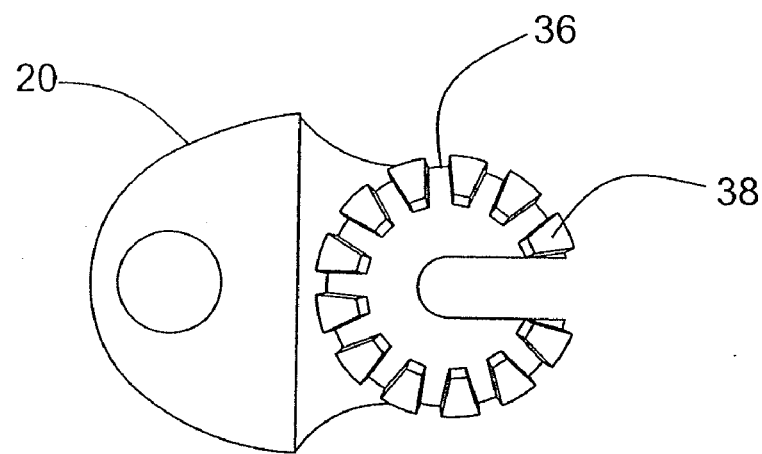
FIG. 8 is a perspective of the roller support adapter of the illustrated roller assembly.
Figure 7:
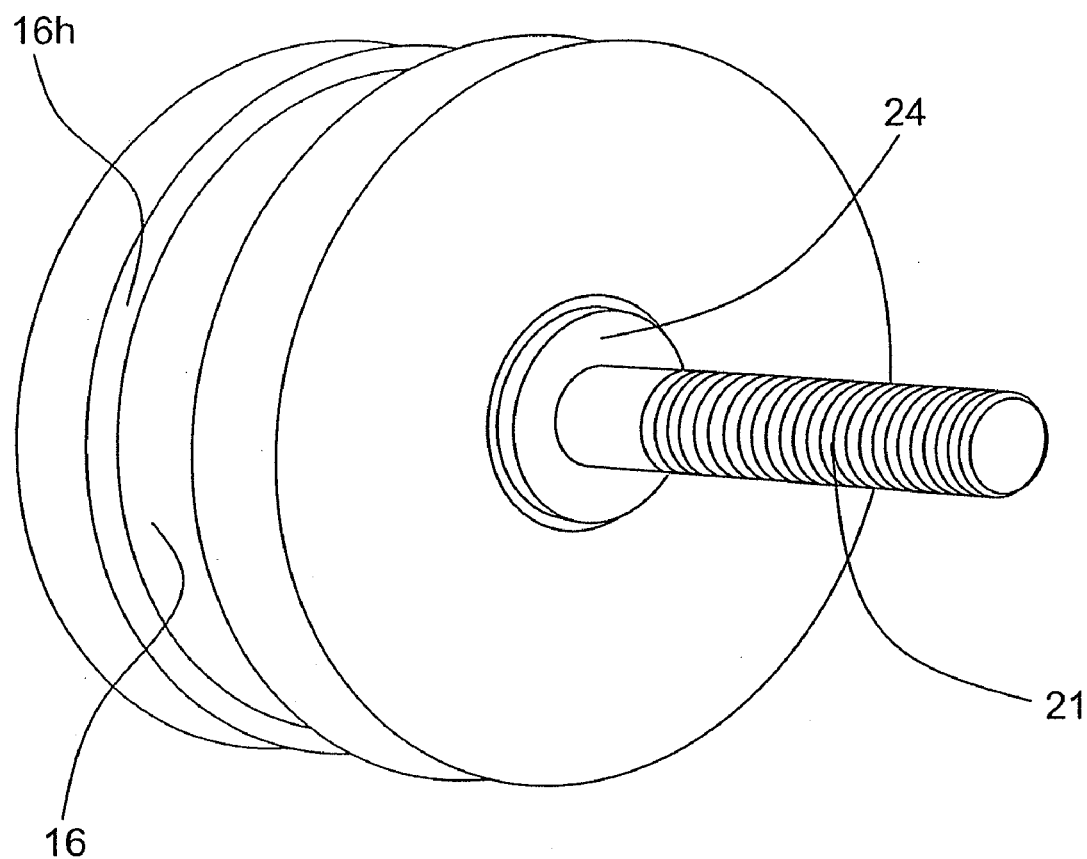
FIG. 7 is a perspective of the roller of the illustrated ice removal roller assembly.

In use, as depicted in FIGS. 2 and 3, the pole sections 12a may be extended to the height of the utility power line 11 from which ice is to be removed. A workman standing on the ground, may then place the roller 15 over and onto the utility power line so that the channel 16 thereof is positioned over the line 11 and retained thereon between the roller side flanges 16b. By pulling down on the pole 12 and walking forward, the roller 15 will exert sufficiently high forces on the ice so as to dislodge it from the line 11 as the roller 15 is moved along the length of the utility power line. It will be appreciated because the weight of the pole 12 itself creates a downward force of the roller on the ice and utility power line less effort is required by the workman. Instead, as the workman walks forward pulling the roller along the utility power line 12, the ice is quickly dislodged and removed without excessive exertion by the workmen. Moreover, the workmen may walk laterally to the side of the utility power line 12 so as to avoid being showered or potentially injured by the falling ice. On reaching the end of the span of the utility power line 12 at a next support pole 39, the workmen may easily lift the roller 15 off of the completed line and position it on an adjacent utility power line for return to the original pole 39, thereby avoiding deadhead walking back to the original pole.

Figure 9:
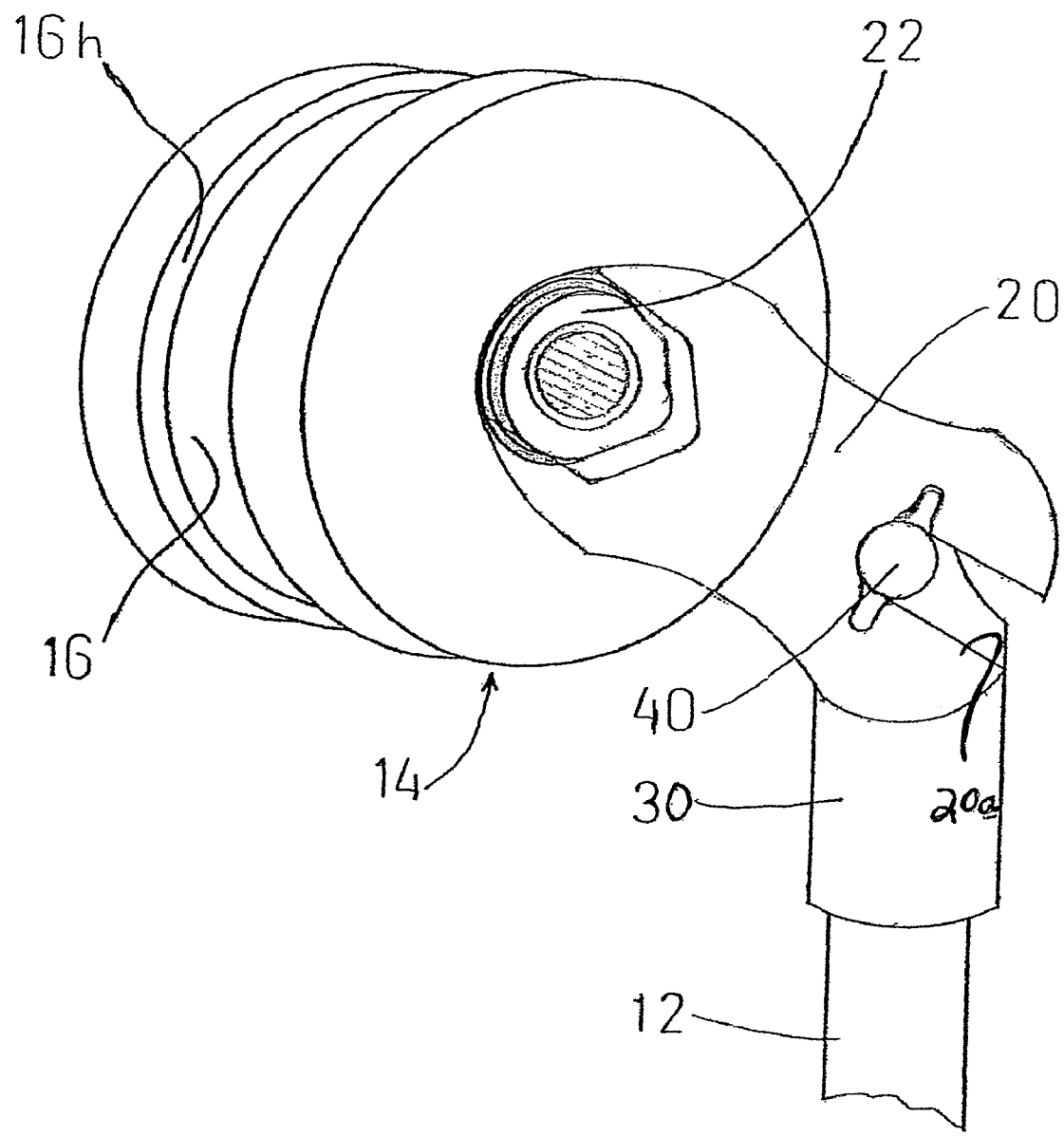
FIG. 9 is a perspective of the ice removing roller assembly with an alternative adjustable mounting arrangement, disposed at an angle of 45° to a support pole.
Figure 10:
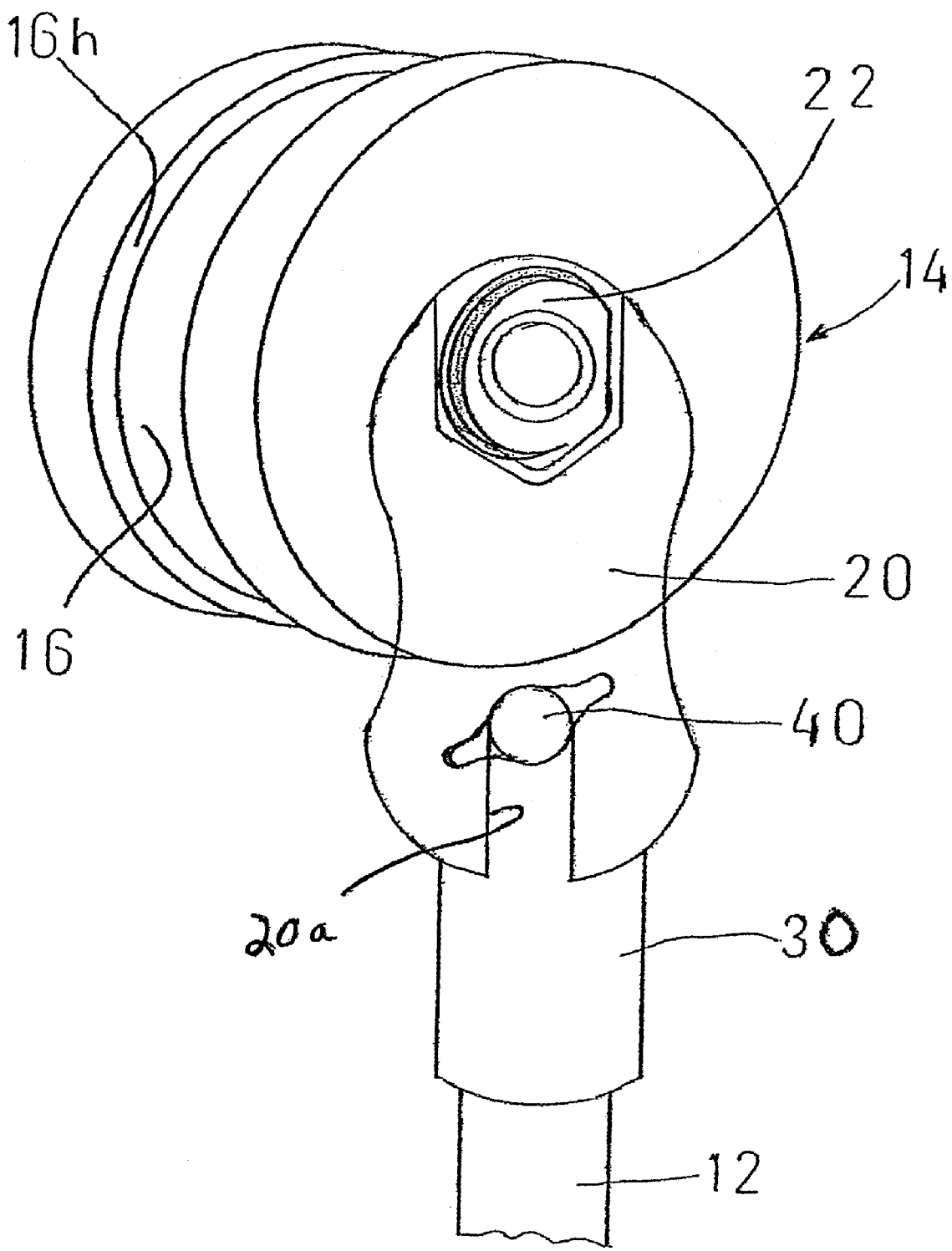
FIG. 10 is a perspective of the roller support assembly shown in FIG. 9 with the adaptor oriented vertically in line with the support pole.

Referring now more particularly to FIGS. 9 and 10 of the drawings, there is shown an ice removing roller assembly having an alternative embodiment of roller support adaptor 20, wherein items similar to those described above have been given similar reference numerals. The adaptor 20 in this case has a U-shaped mounting slot 20a which can be adjustably secured to the pole at selected relative positions, and thereupon fixed by a wing head bolt 40. As shown in FIG. 9, the adaptor may be fixed at an angle of about 45° to the support pole 12. In some instances this angle enables a tighter fit between the pole adaptor 30 and the roller during positioning of the roller assembly onto the utility power line providing greater mechanical leverage on the utility power line for dislodging ice accumulation while keeping the workmen out the plane of the falling ice. During use of the ice removal device 10 in the manner indicated above, at temperatures around 32° F. the ice is likely only loosely frozen. By pulling down on the pole 12 and walking forward, the roller 15 will exert sufficiently high forces on the ice so as to dislodge it from the line 11 as the roller 15 is moved along the length of the utility power line. Applying extra downward pressure to the support pole 12 will aid in removing more stubborn ice. The roller 15 and the line 11 work together to apply opposing forces, essentially breaking the ice caught in between and causing it to break away.

In heavier ice accumulations, temperatures well below 32° F., a workman standing on the ground may then place the roller 15 over and onto the utility power line 11, apply downward pressure to the support pole 12, and rotate the roller assembly 14 to either the left or the right until the side flanges 16b make contact with the ice. This, results in breaking open a section of ice exposing the line 11 giving the workman a starting point. Keeping the roller assembly 14 rotated in the direction chosen; with the side flanges 16b in contact with the ice and applying as much downward pressure on the support pole 12 as needed effects removal of the ice. This method allows the line 11 to pass through the roller 15 at an angle. As the chamfer 16h on the trailing side flange 16b ejects the ice while the circular bottom 16a in the annular channel 16 of the roller 15 cleans what would be left behind. A workman may need to adjust the amount of force needed on the support pole 12 and how far to rotate the roller assembly 14 due to variables such as the amount of ice accumulation and temperature. When the lines 11 are high enough above the ground that the full length of the support pole 12 is needed to reach the line 11, the adaptor to the roller assembly 14 can be adjusted in a vertical position to the pole adapter 30 as depicted in FIG. 10 instead of the 45° or less angle. The previously stated work methods still apply to this alternate mounting of the roller assembly 14.

From the foregoing, it can be seen that the utility power line ice removal method and apparatus enables more efficient, effective, and safe removal of ice from utility power lines. The apparatus eliminates the necessity for workmen to climb utility power line poles or to captively secure an ice removal device around the utility power line. Hence, the ice removal may be carried out without de-energizing the utility power line or otherwise disrupting customer power service. Even more importantly, the ice removal can be carried out by a single workman while working on ground level and requires significantly less physical exertion than prior ice removal methods. As is apparent from the foregoing, the ice removal device is relatively simple in design and economical in construction.

What is claimed is:

1. A method of removing ice from utility power lines supported at an elevation above the ground comprising the steps of providing a tool having an extendable pole made of electrically non-conductive material for withstanding power voltage up to 100,000 volts with an ice removing roller with an outer annular channel rotatably supported at an end of the extendable pole, manually extending the pole from a retracted position to an extended position having a length sufficient for placing the roller onto and over an ice-laden line by a user standing on the ground holding the pole, rolling the roller over the ice-laden line to dislodge ice from the power line by a user walking on the ground below the power line in a direction generally parallel to the power line while holding the pole at an angle to the power line so that the roller is not directly overhead of the user, and forcing the roller against the power line and ice thereon by (1) allowing the weight of the tool to hang from the power line and (2) manually pulling the pole in a downward direction by the user with sufficient additional force as to effect dislodgement and removal of ice from the power line.

* * * * *